United States Patent [19]

Unterstein et al.

[11] Patent Number: 4,727,902
[45] Date of Patent: Mar. 1, 1988

[54] VALVE ARRANGEMENT

[75] Inventors: Klaus Unterstein, Duesseldorf; Sigfrid Büchele-Buecher, Meerbusch-Struemp, both of Fed. Rep. of Germany

[73] Assignee: Rheinmetall GmbH, Duesseldorf, Fed. Rep. of Germany

[21] Appl. No.: 893,424

[22] Filed: Aug. 5, 1986

[30] Foreign Application Priority Data

Aug. 31, 1985 [DE] Fed. Rep. of Germany ....... 3531189

[51] Int. Cl.⁴ .............................................. F16K 17/06
[52] U.S. Cl. .................................. 137/454.5; 137/536; 137/540; 251/368
[58] Field of Search ..................... 137/454.5, 536, 540, 137/539.5

[56] References Cited

U.S. PATENT DOCUMENTS 1,020,641  3/1912  Dronsfield ........................ 137/540
3,105,517 10/1963  Alfieri ............................... 137/540
4,531,542  7/1985  Looney ...................... 137/539.5 X

FOREIGN PATENT DOCUMENTS 1354212  1/1964  France ................................ 137/536

Primary Examiner—Robert G. Nilson

[57] ABSTRACT

A pressure relief valve for a hot gas generator is constructed as a valve arrangement which can be subjected to high temperature shocks and abrasion causing gaseous streams. The valve arrangement is constructed so as to have a prolonged operative life despite such operative demands, whereby simultaneously the predetermined pressure resistance for this valve arrangement is precisely maintained. For this purpose the valve arrangement includes a piston of substantially longitudinal cylindrical shape which has hemispherically shaped ends. A coil spring is operatively maintained behind the piston between a pair of end pieces which bias the piston towards a combustion chamber. The valve arrangement includes a valve body in which the piston is slidably moved. The valve body is made of a high temperature molybdenum alloy, whereas the piston, the seat and the end pieces for the coil spring 16 are made of a material having poor heat conduction characteristics, preferably silicon nitride.

3 Claims, 2 Drawing Figures

VALVE ARRANGEMENT

BACKGROUND OF THE INVENTION

A valve arrangement of the type described herein is used as a pressure relief valve for a hot gas generator which is used in a combustion chamber in which highly pressurized gases are produced by a propellant charge. Such arrangement is generally mounted in the outer wall of the nozzle of a projectile or missile. By the use of such a pressure relief valve the flight path of the missile can be corrected by producing a correcting thrust. The gases produced by such a hot gas generator have a very high temperature in the range of 1400 K to 2000 K and stream with very high velocity through the valve arrangement when the latter is opened in the combustion chamber so as to act as a pressure relief valve for reducing the excess pressure peaks in the combustion chamber. Pronounced wear in the component parts of such valve arrangements has been observed as a result of the high operating gas temperature and gas velocities in the known valve arrangements which wear exhibits itself in the form of washed-out and abraded portions of those parts of the valve arrangement which are exposed to the gaseous streams. As a result of this wear a malfunction-free functioning of such a valve arrangement over a long period of time cannot be expected. In addition to the foregoing impermissible heat transfer onto the spring element of this known valve arrangement was observed, which causes a change in the elasticity of the spring element and thereby the maintenance of a predetermined pressure equilibrium in the combustion chamber cannot be expected.

SUMMARY OF THE INVENTION

It is an object of this invention to provide an improved valve arrangement in which the aforedescribed drawbacks are not present. It is another object of this invention to provide an improved valve arrangement which is wear-resistant and temperature resistant and as a result thereof provides a secure functioning of the valve arrangement over an extended period of time.

BRIEF DESCRIPTION OF THE DRAWING

Other objects and advantages will appear in the following description, which taken with the drawings, presents a non-limiting explanation two embodiments of the invention which are especially adapted to provide a wear and temperature-resistant valve arrangement.

DETAILED DESCRIPTION

Figure 1:
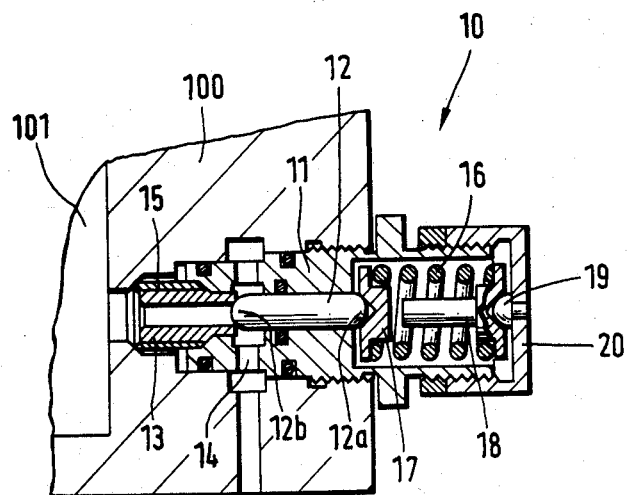
FIG. 1 is a first embodiment of a valve arrangement of this invention shown in longitudinal section.

The drawing only illustrates those parts which are essential to an understanding of the invention. The valve arrangement forms part of a hot gas generator, which is arranged within a missile or projectile whose flight path is controllable within the final phase of the flight. FIG. 1 illustrates partially the housing 100 of a hot gas generator which encloses a combustion chamber 101. In this combustion chamber 101 gases are produced by a non-illustrated pyrotechnic propellant charge, the temperature of which ranges from 1400 K to 2000 K. These very highly heated hot gas is conducted to a non-illustrated guide nozzle, which is mounted on the periphery of the flying body, and which upon being charged with the gases produced by the hot gas generator produces a thrust that can be used for flight correction onto the flying body. In order to maintain a uniform pressure level in the combustion chamber 101, which is required for an optimum combustion of the propellant charge and a loading of the guide nozzle, a bore is provided in the housing 100 in which the valve arrangement 10 is mounted. This valve arrangement 10 acts as a pressure relief valve and relieves pressure surges that exceed a predetermined operating pressure within the combustion chamber 101. For this purpose the valve arrangement 10 has a valve body 11 which is movably mounted in the longitudinal axial direction. The valve body 11 has a piston 12 which is loaded by means of a coil spring 16 which biases it into a sealing position. When pressure peaks appear within the combustion chamber 101 the piston 12 is lifted from its seat 13 and exposes a gas conduit which extends between the inner space of the combustion chamber 101 and the opening 14. The pressure value, which brings about this pressure relief via the valve arrangement 10, is determined substantially by means of the characteristic of the coil spring 16. This coil spring can be influenced by high temperatures which is an undesirable side effect. In order to minimize these disadvantageous effects due to thermal shocks, the piston 12 is constructed as a longitudinal substantial cylindrical body of as reduced a cross-section as possible. The ends 12a and 12b of the piston 12 are hemispherically shaped. The end which confronts the combustion chamber 101 abuts in its inactive position against the valve seat 13 of the valve arrangement 10 and thereby seals the opening 14 with respect to the combustion chamber 101. The coil spring 16 which loads and biases the piston 12 is arranged behind the piston 12, as viewed from the combustion chamber 101, for the purpose of being as far removed as possible from the heat source. The coil spring 16 is disposed between end pieces 17, 18. Whereas the end piece 17 is loaded by the hemispherical end 12a of the piston 12, it is centered by means of a recess in the end piece 17, whereas the second end piece 18 is in turn axially centered with a mating recess and hemispherical projection 19 on the end face of the housing nut 20, which is threadably mounted on the valve body 11. By rotating the housing nut 20, the prestress of the coil spring 16 can be simply adjusted. In the embodiment of FIG. 1 the valve seat 13 is formed by means of a hollow cylindrical insert which is surrounded by a sealing ring 15, which is shaped as some kind of a casing. This sealing ring 15 prevents the penetration of hot gases from the combustion chamber 101 via the exterior peripheral surface of the valve arrangement 10.

In order to maintain a sound operative condition of this arrangement despite the high temperature shocks to which it is subjected particular attention must be given to the selection of material for the various components forming the valve arrangement 10. In an advantageous embodiment of the invention the valve body 11 consists of a high temperature molybdenum alloy. The following alloy has been found to be particularly suitable for this valve arrangement: a molybdenum alloy manufactured by FIRMA METALLWERKE PLANSEE AG of AUSTRIA and marketed with the commercial name TZM. Copy of a pmaphlet describng the molybdenum alloy is attached and incorporated by reference.

The piston 12, which performs the opening and closing function of the valve arrangement 10, does in turn consist of silicon nitride as preferably do the valve seats 13 and 23. This material has a sufficiently high temperature resistance and a very exceptional resistance to hot gases which are contaminated with combusted particles. The end pieces 17 and 18 for the coil spring 16 and the hemisphere 19 for centering the end piece 18 can also be made of a material of reduced heat transfer characteristics as for example silicon nitride.

Figure 2:
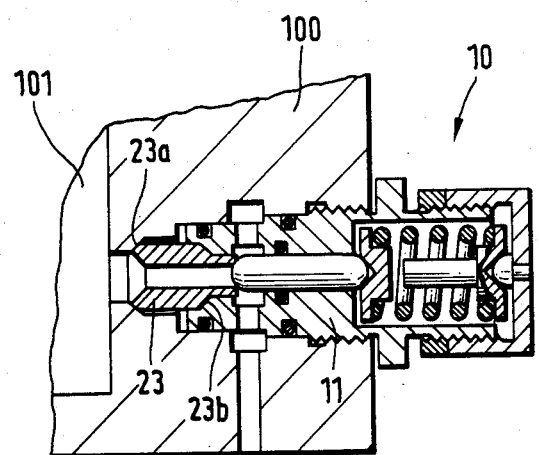
FIG. 2 is a further second embodiment of a valve arrangement of this invention shown in longitudinal section.

For purposes of even higher temperature resistance, the embodiment of FIG. 2 of the invention has the valve seat 23 constructed in such a way that the sealing ring 15 (see FIG. 1) can be dispensed with. The valve seat 23 has a substantially bottle-shaped configuration, whereby the region of the larger diameter is provided with end surfaces 23a, 23b which are skewed with respect to the longitudinal axis, respectively are rounded off. The surface 23 form-lockingly and gas-sealingly abuts against the corresponding mating counter surface in the valve body 11. There is also provided a skewed surface in the bore disposed within the housing 100 of the valve arrangement 10 against which the screwed-in valve body 11 abuts with its surface 23a of the valve seat 23 to thereby form a gas seal.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

We claim:

1. A valve arrangement including pressure relief means for use as a pressure valve in a combustion chamber of a hot gas generator, comprising in combination, a combustion chamber housing, a valve body threadably mounted in said combustion chamber housing; said valve body defines an axial cylindrical bore;

a rod-shaped piston is slidably mounted in said bore; the axial ends of said rod-shaped piston are hemispherically shaped;

a coil spring coaxially mounted in said valve body behind said piston as viewed in a longitudinal axial direction from the combustion chamber outwardly through the axial bore; the diameter of said rod-shaped piston being substantially smaller than the diameter of said coil spring;

a pair of end pieces, each end piece of said pair of end pieces abuts against one end of said coil spring, one of said end pieces also abuts against the axial end of said rod-shaped piston which confronts the combustion chamber and the other end piece abuts against said valve body; a housing nut having a bottom and an internally threaded blind bore; and a hemispherical projection axially extending from the bottom into said valve body, a first axial recess in said other end piece, said hemispherical projection extending into said first axial recess; whereby the axial end of said rod-shaped piston which abuts against the end piece lifts therefrom upon the occurrence of a pressure peak of predetermined magnitude in said combustion chamber; said piston, said valve seat member, said end pieces and said hemispherical projection are made of a material having poor heat conductivity characteristics;

wherein said valve seat member has the shape of a bottle, the portion of said bottle-shaped valve seat member of maximum diameter has a frusto-conical surface which sealingly abuts against a frusto-conical counter surface in said housing.

2. The valve arrangement as set forth in claim 1, wherein said valve body includes an axially extending hollow cylindrical valve seat member, a sealing sleeve coaxially mounted on said valve seat member.

3. The valve arrangement as set forth in claim 1, wherein said material having poor heat conductivity characteristics is silicon nitride.

* * * * *